United States Patent [19]

Reeberg

[11] 4,254,926
[45] Mar. 10, 1981

[54] GREASE GUN STAND

[76] Inventor: Christiaan C. L. Reeberg, 111-67 145th St., Jamaica, N.Y. 11435

[21] Appl. No.: 933,512

[22] Filed: Aug. 14, 1978

[51] Int. Cl.³ ............................................. F16M 13/00
[52] U.S. Cl. ................................................... 248/152
[58] Field of Search ...................... 248/80, 83, 84, 105, 248/106, 152, 153, 154, 201, 316 R, 519, 671

[56] References Cited

U.S. PATENT DOCUMENTS

| | | | |
|---|---|---|---|
| 1,806,560 | 5/1931 | McKinley | 248/313 |
| 2,003,837 | 6/1935 | Skoglund | 248/83 |
| 2,810,536 | 10/1957 | Cunningham | 248/671 |
| 3,224,644 | 12/1965 | Davis | 248/313 X |
| 4,150,806 | 4/1979 | Dziuk | 248/105 X |

Primary Examiner—William H. Schultz

[57] ABSTRACT

An elongated base-panel of rectangular shape is provided with upright end flanges that are substantially parallel and have round holes in alignment for holding horizontally the cylinder of a grease gun that is secured in place by a cylindrical clamp attached to one end flange adjacent to hole therein, with the hand of the gun extending over the top thereof. Thus, the gun handle can be operated with one hand, while the other hand is free to manipulate a grease fitting to avoid any leakage of grease; and the gun and stand can be moved from place to place as desired.

2 Claims, 2 Drawing Figures

GREASE GUN STAND

BACKGROUND OF THE INVENTION

This invention relates to stands and more particularly to one for making possible the operation of a grease gun with one hand, leaving the other hand free for manipulation of the fitting.

Prior to the invention, both hands were required to operate the gun. One hand was needed to hold the cylindrical part of the gun, while the other hand was needed to operate the grease gun handle. This left the grease fitting unattended with the possibility of a grease spill a certainty.

The main object of this invention is to provide a grease gun stand that makes it possible for one person to operate a grease gun with one hand, while leaving the other hand free to take care of the grease fitting.

Other objects are to provide a grease gun stand that is light, portable, simple, inexpensive to make, easy to assemble with the grease gun, and effective and efficient in use.

BRIEF DESCRIPTION OF THE INVENTION

The invention provides a grease gun stand in which the cylinder of the gun is mounted in round holes in upright end flanges of a flat, elongated base panel composed of metal or plastic material that is substantially rectangular shape. The gun is held in place on the stand by a cylindrical clamp that is attached to one flange adjacent the hole therein. The clamp is provided with a screw for tightening or releasing the gun cylinder as desired.

With the invention, operation of the grease gun becomes more efficient and practical, since one hand is used to operate. the grease gun, while the other hand can hold and direct the grease fitting to the proper position and place. With this invention no grease spill is possible and the operation of the grease gun is highly efficient and practical.

DETAILED DESCRIPTION OF THE INVENTION

Figure 1:
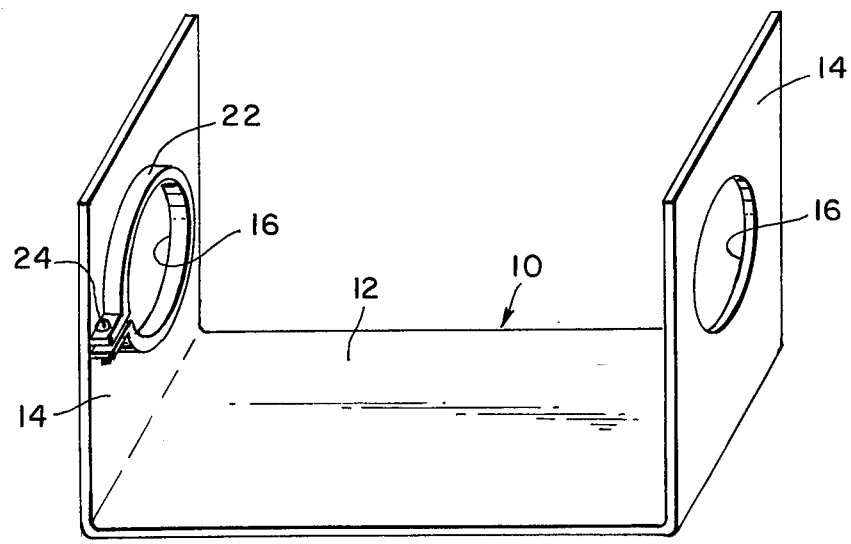
FIG. 1 is a perspective view of a grease gun stand illustrative of the invention.
Figure 2:
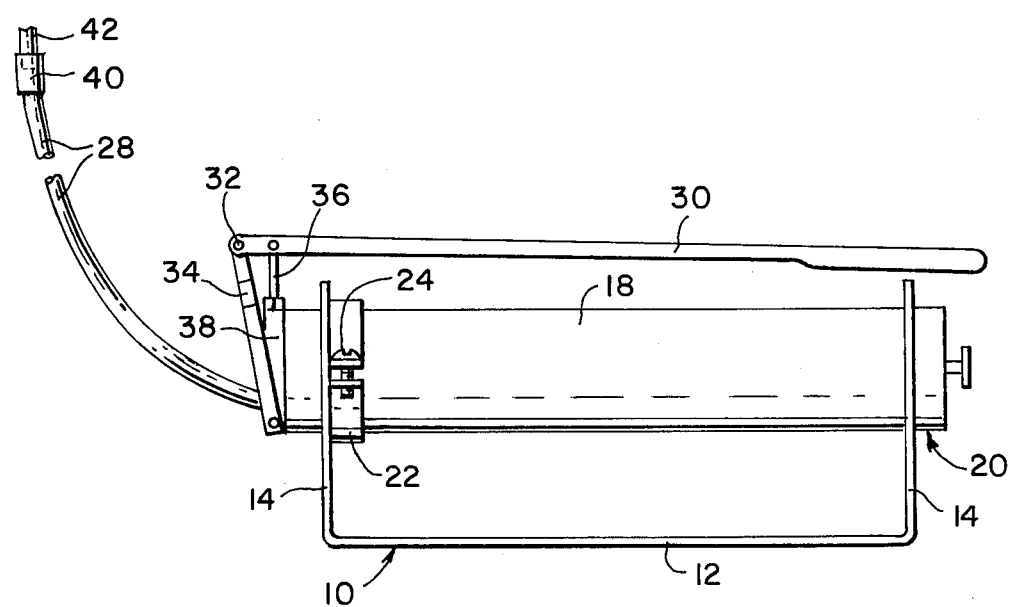
FIG. 2 is a view in side elevation thereof.

As shown in the drawings, the illustrated grease gun stand 10 consists of a flat, rectangular base panel 12, that is somewhat elongated, having upright, parallel and flanges 14, 14. The flanges 14 are provided with horizontally aligned round holes 16 for holding horizontally the cylinder 18 of a grease gun 20. The cylinder 18 is secured in place by a single cylindrical clamp 22 provided with a tightening screw 24. The clamp 22 encircles the gun cylinder 18, and is attached to the corresponding flange 14 along the edge of hole 16.

The round holes are horizontally aligned and just large enough for the cylindrical part 18 of the grease gun 20 to pass through them. The clamp 22 is fastened to one of the upright flanges 14 directly in front of the corresponding hole; and can be opened or closed by loosening or tightening the screw. The grease gun is placed in the stand longitudinally through the holes; and secured by tightening the clamp screw and then placed on the ground or on a solid platform.

With the grease gun 28 secured in the stand 10, one hand can pump the handle while the other hand can direct the grease fitting in the proper direction and place. When the grease gun 20 is mounted in the stand 10, the grease gun 20 can be operated more efficiently and with greater flexibility in use. Prior grease gun use made some operations difficult and sometimes impossible. Prior to the invention resistance in the male fitting was great and it was not possible to hold a grease gun in one's hand and pump the handle without moving the grease gun and causing the grease fitting to fly loose. And when both hands were needed to operate the grease gun, the grease fitting was unattended, with the result that the grease fitting easily came loose.

When the two grease fittings, male and female, are not held tight against each other and are not in the same direction, a grease spill was inevitable.

The grease did not penetrate through the male grease fitting but was spilled on the side of the two grease fittings and wasted.

Overcoming such difficulties and deleterious effects, the present invention eliminates such troublesome problems by providing a simple light, efficient, durable and practical stand for the gun.

The principal advantage of the invention is a grease gun stand which makes the operation of the grease gun more efficient and practical in use.

I claim:

1. A portable stand for a grease gun having an elongated cylinder comprising:
   a flat, substantially rectangular base panel, an end flange extending upwardly from each end of said base panel, said end flanges being substantially parallel, each end flange being provided with a hole intermediate its ends, said holes being horizontally aligned for receiving said cylinder, a generally cylindrical clamp secured to one flange adjacent the edge of the hole, a portion of the clamp being unattached to said flange to permit said clamp to be constricted about said cylinder, said clamp comprising a screw for constricting same about said cylinder, said base panel and end flanges being formed from a single piece of material.

2. A portable grease gun stand as defined in claim 1 which is made from metal or plastic.

* * * * *